United States Patent Office 3,367,254
Patented Feb. 6, 1968

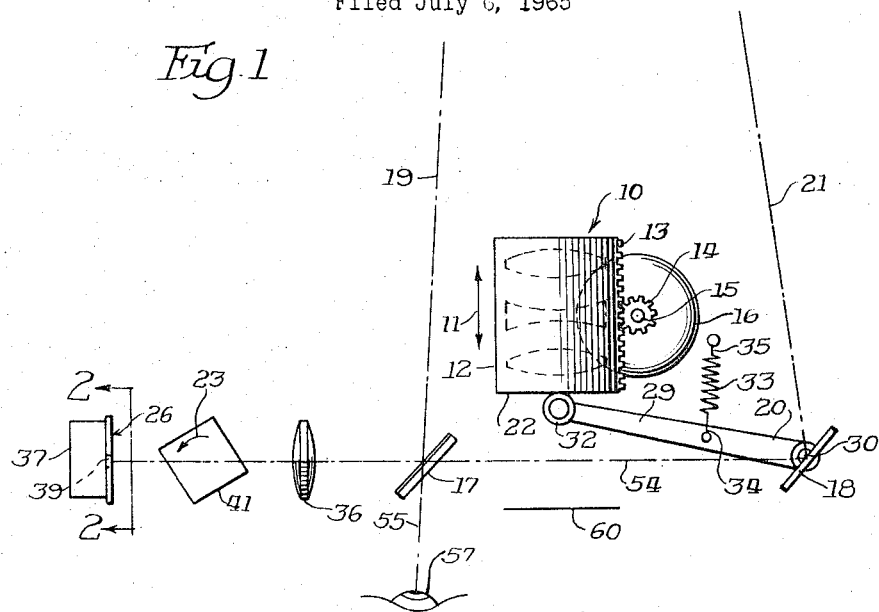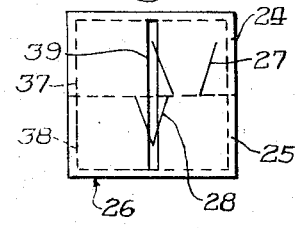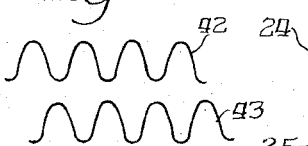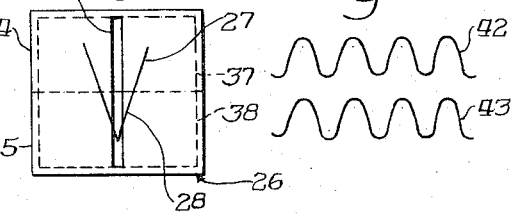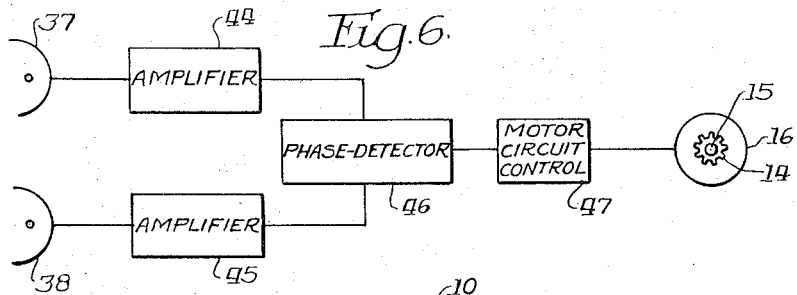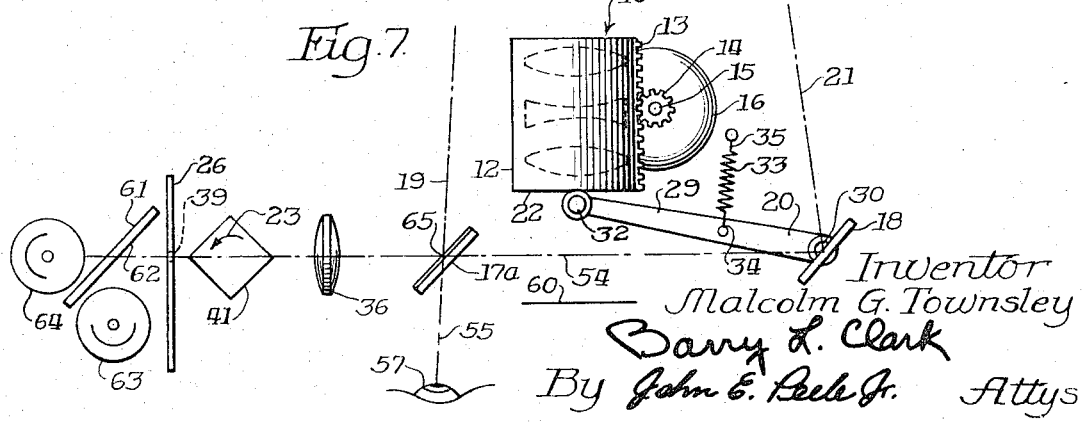

3,367,254
AUTOMATICALLY ADJUSTABLE RANGEFINDER
Malcolm G. Townsley, Park Ridge, Ill., assignor to Bell & Howell Company, Chicago, Ill., a corporation of Illinois
Filed July 6, 1965, Ser. No. 469,640
10 Claims. (Cl. 95—44)

The present invention relates to rangefinders, and more particularly, the invention relates to an automatically adjustable rangefinder for photographic cameras and the like.

A rangefinder is a mechanism which facilitates the measurement of distance from an observer to a subject. In a photographic camera, a rangefinder is commonly coupled to the focusing mount of the objective lens in such a way that adjustment of the rangefinder controls the adjustment of the lens for focusing the image of the subject onto the film plane in the camera, and when the rangefinder indicates that the lens is set for the distance to a selected subject, the image will be in sharpest focus on the film.

Conventionally, a rangefinder for a photographic camera comprises a pair of mirror holding mounts disposed in spaced relation to each other, and in a predetermined relationship with the structure of the camera. The mirror in one of the mounts is fixed to the body of the camera. The mirror in the other mount is adjustable, usually by slight rotation about an axis at right angles to the line joining the two mirrors. In a visually operated rangefinder, the operator looks past the edge of the fixed mirror to view a portion of the subject. At the same time, he views the subject by reflection in the two mirrors, which are arranged so that he sees the same field of view by reflection, but from a viewpoint displaced by the distance between the two mirrors. If, for example, the two mirrors are precisely parallel, the two portions of the subject view will be laterally displaced with respect to each other by the distance between the two viewpoints.

If, now, the movable mirror is rotated about its axis, the images for any selected plane in the subject may be brought into coincidence, and the rotation of the movable mirror is a measure of the distance to the selected plane of the subject. The camera operator has at his disposal a control which can rotate the movable mirror to bring about this coincidence, and makes a visual judgment as to the precision with which the coincidence exists.

Conventional rangefinders are either of the split field or of the coincidence type. In a split field type, the operator sees the field divided into halves with the division parallel to the line joining the two viewing stations, with one half viewed directly, and the other half viewed by two reflections in the two mirrors. In a coincidence rangefinder, the fixed mirror is semi-reflecting, so that the operator can see the entire field of view through the mirror. The movable mirror is fully reflecting, and usually defines a smaller field than the fixed mirror. In this arrangement, the operator sees the full field through the fixed mirror, and sees by reflection, the smaller field from the viewpoint of the movable mirror, which will generally be displaced from the full field image. In the split image rangefinder, the operator manually adjusts the rangefinder to bring the upper and lower portions of the field of view into position so that there are no discontinuities in lines in the subject which cross the division between the two fields. In the coincidence rangefinder, the smaller, displaced portion of the image is brought into coincidence with the rest of the field. In either case, focusing has been achieved when the two images are coincident or in register.

The coupling between the objective lens mount of the camera and the rotation of the movable mirror is arranged so that when the images seen through the rangefinder are in coincidence or in register, the objective is adjusted to focus the selected plane in the subject in sharpest focus on the film plane, as already described.

Regardless of the type of rangefinder, the focusing adjustment is dependent on the acuity and the carefulness of the adjuster. The adjustment of a rangefinder depends, then, on subjective considerations, and on the skill of the operator. As a consequence, less than optimum focusing results are generally achieved by average photographers, and the focusing operation is generally regarded as onerous and difficult.

In accordance with the instant invention and as an object thereof, there is provided a rangefinder and the like adapted for photographic cameras, but not restricted to this use, which is adjustable without reference to subjective considerations.

It is a further object of the instant invention to provide automatic focusing or a self adjusting rangefinder means and the like, adapted for photographic cameras.

Another object of the instant invention is the provision of a means of adjusting the focusing of an objective lens in a camera by converting the light intensities of a scene into time sequential electrical signals by means of a light responsive means for each of the partial rangefinder images and analyzing means for comparing the phase relationships from the two sets of time sequential electrical signals and means for actuating a mechanical drive mechanism to move the movable mirror of the rangefinder in accordance with the phase relationship of the electrical signals.

A yet further object of the invention is the provision of automatic means for focusing a camera objective lens on a subject, the automatic means characterized by a pair of light sensitive electrical components adapted to generate the time sequential electrical signals when the composite rangefinder image is caused to sweep across the light sensitive electrical elements, the movable mirror being arranged so that when the two sets of electrical impulses are in phase, the reflections from the two viewing stations are in register.

A still further object of the invention is to provide a rangefinder structure in which the operator can view the subject through the rangefinder, and see the composite field of view as seen by the rangefinder from the two viewing stations, so that he can select the subject plane on which he desires to have the objective focused, while the automatic means described bring the two fields into coincidence by electro-mechanical means.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a diagrammatic view in plan of one embodiment of the instant invention employed in connection with a split image rangefinder.

FIG. 2 is a view taken substantially on the line 2—2 of FIG. 1, and looking in the direction of the arrows and showing a slotted screen covering the photoelectric cells in elevation, rotated 90° from the position shown on FIG. 1 with the rangefinder out of coincidence and the rangefinder and the objective out of focus.

FIG. 3 is a view similar to FIG. 2, however, with the rangefinder and the objective in focus.

FIG. 4 is a graphic representation of the time sequential electrical impulses corresponding to the screen condition of FIG. 2 and caused by the photocell arrangement comprising part of the invention.

FIG. 5 is a view similar to FIG. 4, however, graphically illustrating the electrical signals from the photocells when the objective is in focus.

FIG. 6 is a block diagram or schematic of the electrical control means and the mechanical drive means for adjusting the objective and the rangefinder.

FIG. 7 is a view similar to FIG. 1, however, showing the arrangement of the various elements of the system when the rangefinder is of the coincidence type.

Referring now more particularly to the drawings, in FIG. 1 there is illustrated a split image rangefinder adapted for a camera having an adjustable objective lens generally designated by the numeral 10. The objective 10 can be focused by inward and outward movement, in the directions designated by a double headed arrow 11, away from and toward a film plane 60, so that it images a subject (not shown) approximately in the film plane, depending on the adjustment of the distance of the lens 10 from the film plane 60. The objective 10 may be mounted in a conventional frame or lens barrel 12 which has integral with it or attached to it an external rack bar 13, which may be of conventional construction. The rack bar 13 meshes with a pinion 14 which is rigidly secured on a reversibly rotating shaft 15, whereby the barrel 12 is adjusted. The shaft 15 is reversibly driven by a motor 16 which may be suitably disposed adjacent to the barrel 12 in any convenient manner. The motor 16 is operated by means which will be described hereinafter.

For the purpose of illustrating the instant invention, there is first shown and described a conventional split image rangefinder. However, it is not intended that the invention be limited to use with rangefinders of the split image type. As will be presently apparent, the invention is also adapted for use with rangefinders of the coincidence type.

The illustrated rangefinder comprises a pair of split image mirror structures 17 and 18. The mirror 17 is fixed in position, and serves to reflect an image of the upper portion of a subject (not shown) entering along an axis designated by a line 19, and reflected to the left by the mirror 17 as shown in FIG. 1. A rangefinder lens 36 images this portion of the subject on a lower portion 25 of a screen generally designated at 26. The mirror 18 is adjustable by rotation around an axis 30 perpendicular to the plane of the paper in FIG. 1, and serves to reflect an image of the lower portion of the subject (not shown) entering along an axis designated by a line 21 and reflected along an axis 54 to the left of mirror 18. Rangefinder lens 36 images this portion of the subject on the upper portion 24 of the screen 26.

If desired, mirror 17 may be coated with a semi-reflective coating and extended downwardly to give a viewing position at 57 for the photographer so that he can view the scene through the rangefinder and observe the rangefinder adjustment as it takes place for the purpose of being sure that the focus is achieved at the desired plane of the subject. Mirror 17 is properly masked so that it now not only reflects the upper portion of the subject coming to it along axis 19, but also transmits the same along an extension 55 of axis 19 to the viewing station 57. At the same time, mirror 17 not only transmits the lower portion of the subject coming from mirror 18 along axis 54, but also reflects the same along extension 55 to the viewing station 57.

The mirrors 17 and 18 are disposed in alignment with the rangefinder lens 36 and with screen areas or portions 24 and 25 of the screen 26. Screen area 24 has imaged on it by lens 36 the image of the subject which has come to it by way of reflection in mirror 18, which will be an inverted image of the lower part of the subject. Similarly, screen area 25 has imaged on it by lens 36 the image of the subject which has come to it by way of reflection in mirror 17, which will be an inverted image of the upper part of the subject. In a conventional manner, the disposition of the mirrors 17 and 18 is such that when the halves of the reflected subject are misaligned or out of register as seen from station 57 and upon the screen 26, the objective is out of focus, and when the halves of the reflected subject are aligned or in register as seen from station 57 and as imaged upon screen 26, the objective 10 is in focus. The relationship of the images coming from along axes 19 and 21 as viewed at station 57 is the same as that shown on screen areas 24 and 25 except that, since lens 36 is not interposed between station 57 and the subject, the images are not inverted.

On the screen portions 24 and 25, the images will appear as shown in outline only as 27 and 28 in FIGS. 2 and 3, in which the outline designated as 27 came by way of reflection from mirror 18, and the outline designated as 28 came by way of reflection from mirror 17.

The mirror 18 and the objective 10 are coupled in a manner well known in the art, as a result of which, at each position of the mirror 18 the objective 10 has a corresponding setting. Accordingly, by adjusting mirror 18 until the images formed by way of reflection from mirrors 17 and 18, coming from axes 19 and 21 respectively, are registered, the objective is adjusted into focus. Means for accomplishing this coupling of objective 10 to mirror 18 are shown diagrammatically in FIG. 1, in which an elongated lever or arm 29 has an end portion 20 which is pivotally mounted at the axis 30. The pivotal mounting at 30 provides a fixed axis of rotation for mirror 18 which is mounted to be rotated by arm 29. The opposite end portion of the arm 29 carries a rotatable roller or cam follower 32, or the like, which is spring biased against one end portion 22 of the lens barrel 12, as illustrated in FIG. 1. The spring bias is accomplished by a tension spring 33 which has one end portion 34 operably connected to a medial part of the lever 29 and its opposite end portion 35 suitably anchored to a fixed part. It turns out that this specific arrangement for coupling the rotation of mirror 18 to the movement of the lens barrel 12 is only approximately correct, and that compensating means are usually introduced between the two elements, but this compensation is well known in the art, is not a part of this invention, and need not be discussed for a full understanding of this invention.

Turning now to the portion of FIG. 1 which shows the rangefinder lens 36 and the screen 26, and to FIGS. 2 and 3, it will be made apparent how the time sequential electrical signals are generated.

Between the lens 36 and the screen 26 there is disposed a prism 41 which is caused to rotate about an axis parallel to the slit 39 in the screen 26 in the rotational sense shown by an arrow 23. Rotation of the prism 41 causes the images 27 and 28 to sweep across the slit 39. As each corner of the prism 41 crosses the optical axis of lens 36, a new image begins its sweep across the screen 26 and the slit 39. Behind the screen 26 are disposed a pair of electrical light sensitive members which in the illustrated embodiment are the photoelectric cells 37 and 38 as seen in FIGS. 2, 3, and 6. The photoelectric cell 37 is disposed behind and covered by screen area 24 and is operably aligned behind the slit 39 so that it is adapted for response to the portion of the image which came to the rangefinder along axis 19. The photoelectric cell 38 is disposed behind and covered by screen area 25, and said photoelectric cell is operably aligned behind the slit 39 so that it is adapted for response to the portion of the image which came to the rangefinder along axis 21.

Now, as the prism 41 is rotated in the direction of arrow 23, the images 27 and 28 are swept across the slit 39, and their variation in brightness across the subject will cause the photoelectric cells 37 and 38 to produce variations in their generated voltages or in their conducted currents in accordance with the brightness variations of the subject, thus producing time sequential electrical signal or wave patterns 42, 43 characteristic of the subject portions.

When the objective 10 is not in focus, the image portions 27 and 28 will be out of register. Accordingly, while the time sequential electrical signals from the photocells 37 and 38 will be similar, said signal patterns will be out of phase with each other. That is to say, while objective 10 is in the position such that the split image on the screen 26 is out of register, as in FIG. 2, for example, the currents of the photoelectric cells will define a pair of time sequential electrical waves 42 and 43 having patterns which will be out of phase with each other, as illustrated in FIG. 4. When the objective 10 is in focus such that the split image on the screen 26 is in register, as in FIG. 3, for example, the currents of the photoelectric cells will be in phase as illustrated in FIG. 5.

When the rangefinder is of the coincidence type (FIG. 7) there is no difference in operating principle, but a slightly different arrangement of component parts is required to provide for separating the optical images from the fixed mirror and the movable mirror so that each image as it is scanned across the slot in the screen reaches and controls the electrical output from the proper photoelectric cell.

As in the case of the split-image finder, the rangefinder comprises a fixed mirror 17a which reflects an image of the subject (not shown), entering along an axis designated by the line 19, and reflected to the left by the mirror 17a. Mirror 17a has a reflecting coating 65 on one surface which reflects a portion (for example the red portion) of the spectrum and transmits the rest of the spectrum. As viewed from station 57, the subject will be seen in the color of the transmitted light as transmitted by the coating 65. At the same time, the reflected portion of the spectrum will be reflected to the left along the axis 54 and the rangefinder lens 36 will image the subject on the screen 26 in light of this color. The light will pass through the slot 39 in the screen 26. Behind the screen 26 is disposed a reflector 61 which has a partially reflecting coating 62 similar in character to the coating 65 on the mirror 17a. This coating will then reflect light of the same color as was reflected from the coating 65, and this light will reach photoelectric cell 63.

Image forming light entering from the subject (not shown), along the axis designated by the line 21 of FIG. 7 is reflected to the left along the axis 54. When this light strikes the fixed mirror 17a, the red portion of the spectrum is reflected along the extension 55 of axis 19 to the viewing station 57, and the blue portion of the spectrum is transmitted through the coating 65 to the rangefinder lens 36, to be imaged on the screen 26 and swept across the slot 39 in the screen 26. The reflector 61 will transmit the blue light to the photoelectric cell 64.

The red portion of the specrum which is reflected by the coating 65 on the mirror 17a toward the viewing station 57 is seen by the observer at station 57 as being out of register with the blue portion of the image transmitted through the coating 65. These two color contrasting images out of register are the same kinds of images which are usually used in a coincidence type rangefinder for visual operation. When the movable mirror 18 is rotated to bring the two images into coincidence, the blue and red images add visually to produce an image in the full spectrum of colors, so that the operation of the visual portion of the rangefinder is no different from the coincidence rangefinders well known in the art.

The image portions perceived by the photocells 63 and 64 as the image is swept across the slit 39 in the screen 26 by rotation of the prism 41 are received from the fixed mirror 17a and the movable mirror 18 respectively and the time sequential electrical signals derived from the photocells are similar to those derived from the photocells in the split field rangefinder already described, except that in the coincidence type rangefinder, the two images are of the same horizontal section of the subject, and are therefore essentially identical, making the time sequential electrical signals identical except for phase relationship and improving the ability of the phase discriminating unit to determine exact phase matching.

The relationship of the phases of the signal patterns of the current of the photoelectric cells is utilized to bring the objective 10 into focus, as illustrated in FIG. 6. To that end, a pair of amplifiers 44 and 45 may be connected in series to the photoelectric cells 37 and 38, respectively. Amplifiers 44 and 45 are connected in a conventional manner to a phase detector 46 which is responsive to variations in phase and will produce error signals when the waves 42 and 43 are out of phase, in the manner known in the art. The error signals will correspond to the phase relationship of the waves 42 and 43, and such error signals will be transmitted to a motor circuit control mechanism 47 which will correspondingly energize the motor 16 to drive the focusing mount or lens barrel 12 in accordance with the nature of the error signal toward or away from the subject to focus the objective 10 on the film plane 60. Responsively, the mirror 18 will be pivoted, causing a shifting in the split image from non-registered position to the registered image position, as illustrated in FIG. 3. At such time as the split images are registered, the wave patterns 42 and 43 will be in phase. Therefore, no error signals will be emitted by the phase detector 46 and no further impulses will be transmitted to the motor circuit control, the focusing mount or lens barrel 12 then being stabilized in objective-focused position.

It is apparent from the foregoing that the rangefinder is automatically adjustable. In use, an operator need merely look through the rangefinder (which may, if desired, be combined with a viewfinder) and select the scene or subject on which he desires to focus, and the focusing adjustment will automatically take place.

From the foregoing it is apparent that under certain circumstances more discriminate results will be achieved if a full image rather than a split image is referred to each of the photoelectric cells. That is to say, with a rangefinder of the coincidence class, the light impulses to each of the photoelectric cells will be identical, inasmuch as each will be exposed to an entire subject rather than a part of a subject as in the case of the split image rangefinder. Because the wave patterns emitted by the photoelectric cells will then be identical, the problem of phase detection will be minimized. Regardless of the type of rangefinder, however, the principle remains the same, namely that of providing means for sensing at two coordinated stations the relationship of light waves from a subject and then translating such intelligence into electrical impulses to drive an objective into focus.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim as my invention:

1. A rangefinder for photographic cameras and the like having an adjustable objective, said rangefinder comprising:

a fixed mirror structure and an adjustable mirror disposed in pre-determined spaced apart relationship for receiving light reflections from a subject;

said adjustable mirror mounted for adjusting movement with said objective;

a pair of time sequential electrical signal emitting light sensitive members mounted to receive light reflections from said fixed mirror and said adjustable mirror, respectively;

optical means in the path of both of said light reflections before said electrical means to modify said light reflections wherein said electrical means produce an electrical wave signal characteristic of received light reflections wherein said signals from each of said stations is in a given phase;

a phase detector mounted to receive said electrical signals emitted by said light sensitive members and adapted to emit a signal corresponding to the phase relationship of the electrical signal patterns emitted; and a motor connected to said objective and having electrical circuit means actuated by the signal of said phase detector.

2. A rangefinder as defined in claim 1 in which the fixed mirror structure comprises a semi-transparent surface disposed for reflecting light toward one of said light sensitive members and passing light toward a viewing station, said surface also being disposed for reflecting a thereto reflected image from said adjustable mirror toward a viewing station and passing an image reflected by said adjustable mirror toward the other of said light sensitive members.

3. In a rangefinder for a camera and the like including:
a reversibly drivable objective;
the combination of a fixed mirror and an adjustable mirror spaced from said fixed mirror and movable with said objective, with a motor mounted in driving relationship with said objective;
light sensitive electrical means having portions mounted for reception of reflections from said fixed and adjustable mirrors, respectively;
responsively emitting currents, said electrical means connected to said motor for operation thereof according to the relationship of the emitted currents; and
optical means between said mirrors and said light sensitive electrical means to modify said light reflections wherein the relationship of the reflections is alterable to alter the relationship of the emitted currents.

4. A device as defined in claim 3 in which the light sensitive means comprises electrical phase detection means for sensing the relationship of the currents caused by the light reflections from said mirrors and adapted to be responsively energized, and an electrical circuit connected to said motor and responsive to the energization of said phase detection means, whereby said objective is reversibly driven.

5. In a rangefinder having a fixed viewing station and an adjustable mirror viewing station, the improvement comprising:
light sensing electrical means disposed for reception of light reflections from said fixed station and said adjustable mirror station;
optical means in the path of both of said light reflections before said electrical means to modify said light reflections wherein said electrical means produce an electrical wave signal characteristic of received light reflections wherein said signals from each of said stations is in a given phase;
phase detecting means to receive the electrical wave signals from said light sensing electrical means and for emitting a signal corresponding to the phase relationship of said electrical signals; and
signal responsive means for moving the adjustable mirror to coordinate the phase relationship of said electrical signals.

6. A device as defined in claim 5 in which said light sensing electrical means comprises a pair of photoelectric cells disposed for operable alignment with light reflections from said fixed station and said adjustable mirror station, respectively.

7. The device as in claim 6 including:
a lens disposed to image the subject as seen by way of said fixed station and said adjustable mirror station onto a screen having a slot disposed in operable alignment with said images from said fixed station and said adjustable mirror station;
said photocells being mounted behind said screen for reception of light passed through said slot from said fixed station and said mirror station respectively; and in which said optical means is rotatably mounted in alignment with said screen for sweeping said images across that screen over said slot, thereby to actuate said photocells.

8. A device as in claim 5 wherein said signal responsive means for moving the adjustable mirror is a reversibly drivable motor.

9. The device as in claim 8 wherein said signal responsive means when responding to a signal indicative of out-of-phase electrical wave signals from said light sensitive member moves said adjustable mirror to cause said light reflections to produce in-phase electrical wave signals from said light sensitive members.

10. The device as in claim 5 adapted for use in a camera having a focusable objective which is reversibly movable to adjust its focus, said signal responsive means comprising a reversibly drivable motor for moving said adjustable mirror and said reversibly drivable objective whereby when said electrical wave signals are in-phase responsive to the position of said mirror, said objective is focused.

References Cited
UNITED STATES PATENTS 3,274,913  9/1966  Biedermann _____ 95—44

JOHN M. HORAN, *Primary Examiner.*